United States Patent [19]

Brandstedt

[11] 4,455,096

[45] Jun. 19, 1984

[54] TEMPERATURE AND OPERATING MODE DIGITAL DISPLAY HAVING DIRECT AND MIRROR IMAGE VIEWING CAPABILITY

[75] Inventor: Bjorn S. Brandstedt, North Miami, Fla.

[73] Assignee: Brandstedt Controls Corporation, Ft. Myers, Fla.

[21] Appl. No.: 319,978

[22] Filed: Nov. 10, 1981

[51] Int. Cl.³ .......................... B60Q 1/26; G01K 1/14
[52] U.S. Cl. ..................................... 374/170; 340/107; 340/870.17; 350/297; 374/141
[58] Field of Search ................ 374/170, 141; 340/705, 340/702, 57, 870.17, 107; 350/297, 203

[56] References Cited

U.S. PATENT DOCUMENTS

| | | | |
|---|---|---|---|
| 1,806,896 | 5/1931 | Freund | 350/297 |
| 3,366,950 | 1/1968 | Wilson | 340/705 X |
| 3,594,752 | 7/1971 | Alton | 374/166 X |
| 3,932,861 | 1/1976 | Bull | 340/705 X |
| 4,024,495 | 5/1977 | O'Brien | 340/57 |
| 4,232,682 | 11/1980 | Veth | 374/170 X |
| 4,298,947 | 11/1981 | Tamura et al. | 374/170 X |
| 4,336,712 | 6/1982 | Hawkins | 374/141 X |
| 4,348,653 | 9/1982 | Tsuzuki et al. | 340/57 X |

*Primary Examiner*—Daniel M. Yasich
*Attorney, Agent, or Firm*—Erwin M. Barnett

[57] ABSTRACT

A remote readout unit in a weather-proof housing is mounted on the exterior front wall of a temperature controlled trailer truck in a position to be observed by the driver in his rear view mirror and from the ground when the vehicle is parked. The readout comprises three electro-magnetic seven-segment digitals arranged as a two digit indicator for the temperature within the trailer and a single character for indicating the current mode of operation of the refrigerating equipment. The unit, powered by the battery of the trailer, includes a sensing thermistor located in the trailer, connections to each of the three operational mode indicating lights of the refrigerating equipment and a micro-processor located within the housing which in repetitive cycles monitors the temperature and operational mode indicators, processes the information by a permanent program and updates the digital readouts, the latter being selectively determined by the position of a manual switch located on the housing to display the information in either a reverse image for viewing in a rear view mirror or a direct image for viewing from the ground.

9 Claims, 5 Drawing Figures

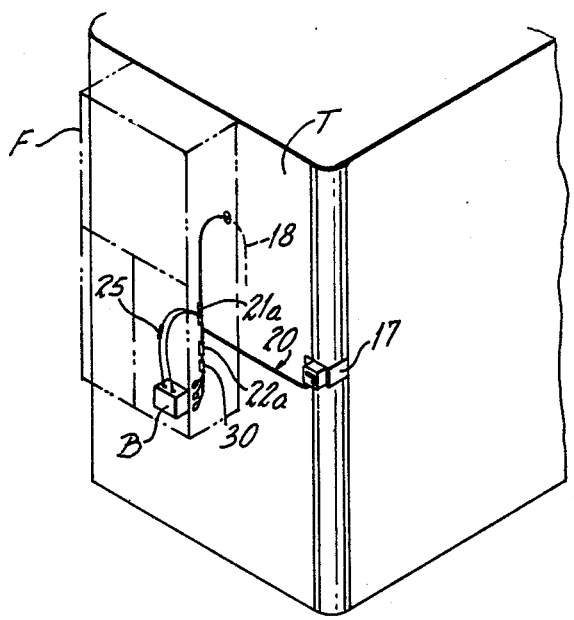
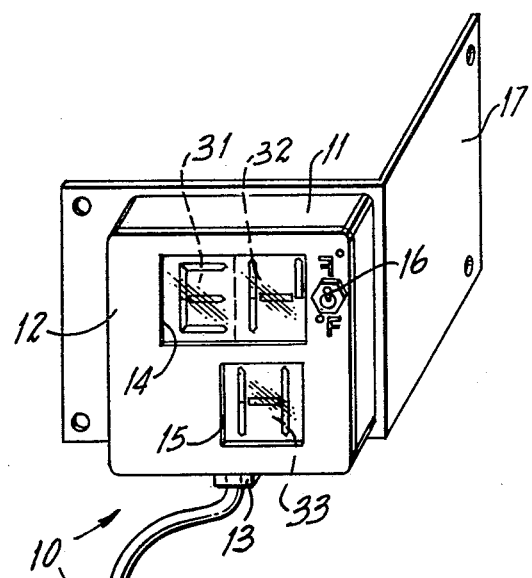
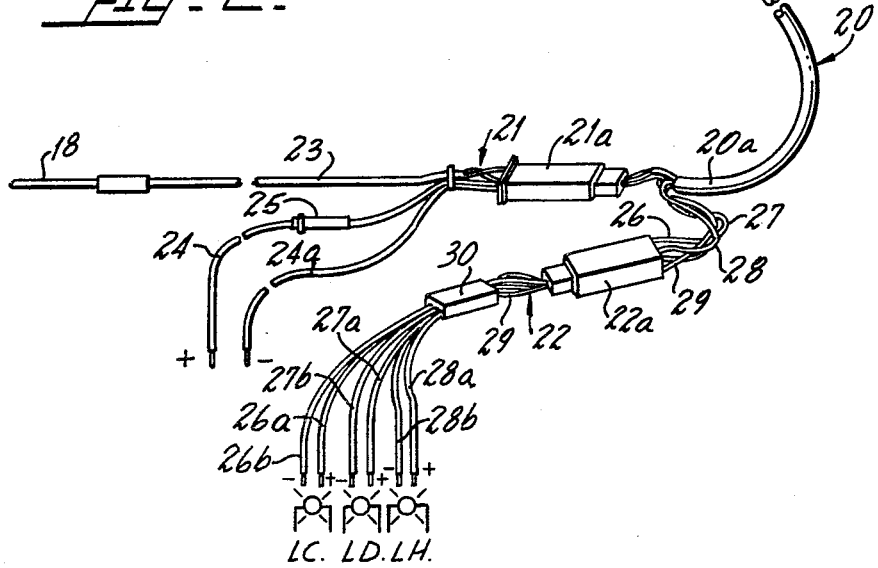

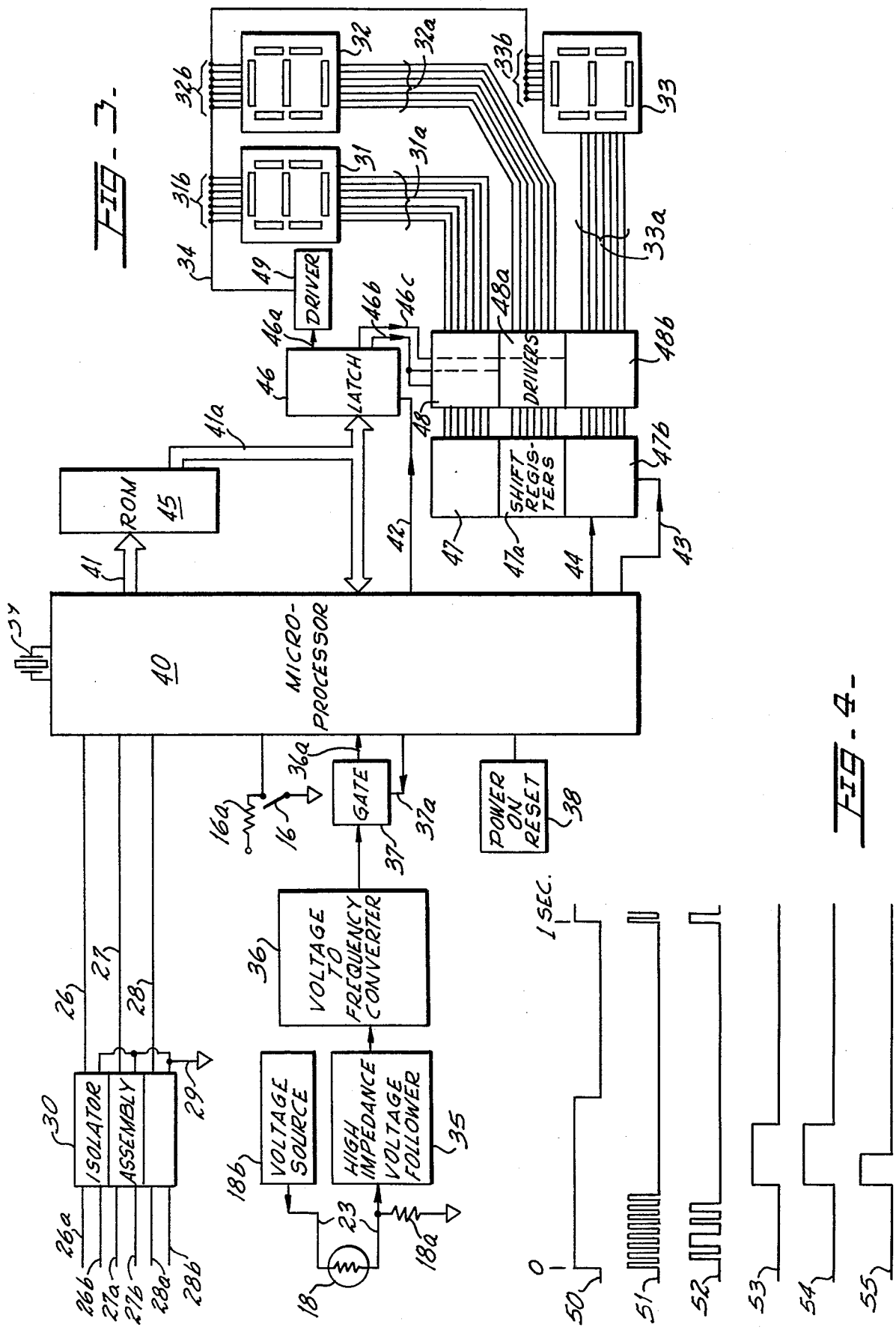

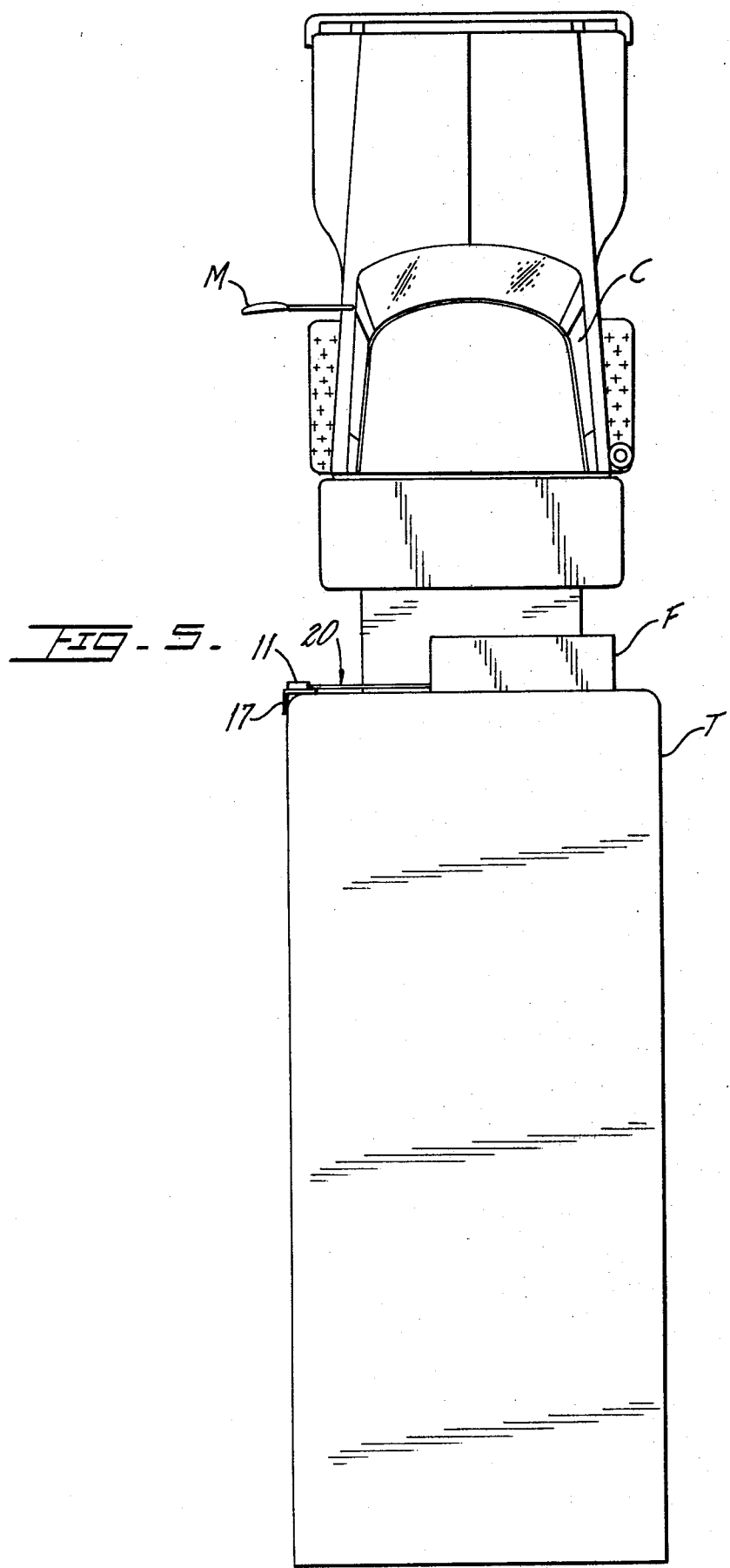

TEMPERATURE AND OPERATING MODE DIGITAL DISPLAY HAVING DIRECT AND MIRROR IMAGE VIEWING CAPABILITY

BACKGROUND OF THE INVENTION

1. Field of the Invention

This invention relates to devices for indicating at a remote station temperature conditions within a storage compartment and the operating mode of the refrigerating equipment thereof and more particularly for use on air conditioned trailer trucks wherein the remote indicators are mounted on the exterior of the trailer and may be selectively displayed as a direct image for viewing from the ground when the trailer is parked or as a mirror image for viewing by the driver in the cab through a rear view mirror.

2. Description of the Prior Art

Refrigeration equipment installed in trailer trucks operate in three modes, namely, cooling, defrosting and heating for closely controlling the temperature within the cargo compartment and usually have temperature and mode indicators positioned at a location inaccessible for viewing when the trailer is in transit or from the ground when the trailer is parked.

Although the need for a highly visible indicator of temperature conditions within the trailer and the operating mode of the refrigeration equipment has long been recognized, solutions to this problem have been limited to alarm warning devices, such as a flashing light and-/or buzzer, which are activated when the temperature within the trailer as determined by a sensor falls outside the range of temperature predetermined in the control circuitry. Thus, U.S. Pat. No. 3,594,752 to Alton discloses a self-contained unit in which the flashing lamp and control circuitry is contained in a housing adapted to be mounted on the outside of the trailer, the temperature sensor being attached to the end of an elongated tubular member extending from the rear of the housing to pass through an opening drilled in the wall of the trailer. U.S. Pat. No. 4,024,495 to O'Brien provides for a temperature sensing circuit within the trailer and a detection circuit and alarm located within the cab, the two circuits being electrically connected through existing wiring between the cab and trailer. These systems are merely warning devices and fail to provide the driver or others responsible for the cargo with readings of updated specific temperature readings. Recently remote temperature readouts located in the cab and connected to the trailer in a manner similar to the O'Brien patent have been made available. However, there still exists a need for a practical readout system for both temperature and mode operation, the installation of which is limited to the trailer yet which can be easily observed from both the cab while the trailer is in transit and from the ground when the trailer is parked. These updated readings of the combination of temperature and mode operation permit corrective action to be taken before and not after critical conditions prevail.

SUMMARY OF THE INVENTION

Among the objects of the invention is to provide a monitoring unit which continually updates a readout of the temperature within the cargo compartment of a trailer truck and an indication of the operational mode of the refrigeration equipment controlling the temperature within the compartment. The monitoring unit shall comprise miniaturized, printed circuit board mounted micro-processor components and an output of seven-segment digitals all housed in a compact weather-proof casing for easy mounting and an electric wire harness extending from the casing enabling installation and hookup by simple connection to the trailer storage battery for power, by insertion of the sensor into the cargo compartment to be monitored and by connection of three pairs of leads, one to each of the mode signal lights of the refrigeration equipment. The digitals shall be of the electro-magnetic type having an orange colored display for maximum visibility both in sunlight and when illuminated at night and be three in number arranged as a two digit temperature indicator and a single character operational mode indicator in close proximity to each other for easy reading at a glance. The casing shall be easily mountable on a bracket on the exterior of the trailer at a location for clear viewing of the digitals by the driver in the cab through his rear view mirror or from the ground when the trailer is parked. The monitoring device shall be capable of displaying the readout either as a reverse image for mirror viewing or as a real image for direct viewing and shall be equipped with a toggle switch for selecting the desired display condition and shall be capable of temperature detection and display over a wide range from $-19°$ to $+80°$ F. with a midrange accuracy of $\pm 1°$ F.

The invention features a remote display by three seven-segment digitals arranged as a two-digit temperature indicator and a single character operational mode indicator, a two position manual switch for selecting either a real or a mirror image display and a permanently programmed micro-processor and ROM coacting with shift registers and drivers which update and display on the digitals, in repetitive cycles and in accordance with the manual switch setting, the compartment temperature and the equipment operational mode. During each cycle the program counts the frequency output of a voltage to frequency converter controlled by a voltage follower which varies in a predetermined relation with the temperature as detected by a thermistor within the trailer compartment being monitored, detects the on/off status of the mode indicator lights on the refrigeration equipment, provides routines for generating and sequencing the shift clock, temperature write, mode write and erase timing signals, converts the counted frequency and the on/off status to one of two alternative binary codes in accordance with the position of the manual switch and generates a serial data output signal which, by shift clock timing control, loads the shift registers. Timed actuation of the drivers by the write and erase signals then enables the data in the shift registers to turn on the appropriate segments of the digitals producing the updated display thereon. A flashing capability for the digitals as a warning signal to the viewer when predetermined conditions or certain malfunctions prevail may be accomplished by the program omitting temperature write and/or mode write signals during alternate cycles. Blanking of the digitals for a small fraction of a cycle solves the objection to a passive display providing a visual impact which clearly differs from the flashing as a warning signal in which blanking occurs for a complete cycle.

The invention also contemplates a display for the temperature only having all the features and capabilities hereinbefore described for the combined display.

BRIEF DESCRIPTION OF THE DRAWINGS

FIG. 1 is a fragmentary perspective view of the front of a trailer truck having refrigeration equipment indicated in phantom for controlling the temperature within the cargo compartment and showing the temperature and operating mode monitoring and remote display unit embodying the invention installed in operative position.

FIG. 2 is an enlarged perspective view of the monitoring and remote display unit of FIG. 1 removed from the installation showing details thereof.

FIG. 3 is a block diagram of the micro-processor controlled circuitry embodying the invention, the components of which are housed within the casing shown in FIG. 2.

FIG. 4 is a graphic representation showing the synchronization of the data and clock signals generated by the circuitry shown in FIG. 3 during each updating cycle, and FIG. 5 is a top plan view of a trailer truck showing the remote display unit installed and a cab with rear view mirror in accordance with the invention.

DESCRIPTION OF THE PREFERRED EMBODIMENT

Referring in detail to the drawings, 10 generally denotes a temperature and operating mode monitoring and remote display unit embodying the invention shown in FIGS. 1 and 2 to comprise a casing 11 secured to an L-shaped mounting bracket 17 and a harness 20 attached by a fitting 13 to the bottom wall of casing 11. The front panel 12 of casing 11 mounts a two-position electric toggle switch 16 and is formed with an upper relatively wide window 14 and a lower narrow window 15, both being made of a transparent material suitably set in panel 12 to provide a water-proof seal. A pair of electro-magnetic seven-segment digitals 31 and 32, serving as the two digit temperature readout, are located in casing 11 for viewing through window 14 and a third digital 33, serving as a single character mode indicator, is located behind window 15. Harness 20, which carries eight wires required as input to unit 10 in a weather resistant sheath 20a, is of a length sufficient to span the distance between the mounting location of casing 11 on trailer T and the housing of refrigeration unit F. Upon emerging from sheath 20a, the eight wires divide into two four-wire branches 21 and 22 which are each provided with a separable connector 21a and 22a, respectively. Branch 21 has a pair of leads 23 connected to the temperature sensor 18 providing input to unit 10 for the temperature display and another pair comprising color coded wires 24, 24a for connecting to storage battery B of refrigeration unit F and providing power for operating unit 10. Wire 24 may be coded red for connecting to the positive battery terminal and may also be protected by a replaceable fuse within a suitable assembly 25. Branch 22 provides input for the mode indicator 33 by lead wires 26, 27 and 28 and a common ground 29, all connected to the output of an isolator assembly 30. The input to the latter are three pairs of wires 26a,26b, 27a,27b and 28a,28b, each pair being color coded for identification and proper connection to the positive and negative terminals of mode signal lights LC, LD and LH of the refrigeration unit R designating operation of the unit in cool, defrost and heat modes, respectively.

Referring to the block diagram in FIG. 3, which for clarity and simplification omits the conventional power supply sources, voltage regulators and related circuitry powered by battery B for operating the electronic components of unit 10, temperature sensor 18 is a thermistor located in the cargo compartment of trailer T and is connected in series with resistor 18a and reference voltage source 18b through the pair of lead wires 23 extending through branch 21, connector 21a and harness 20. Voltage to frequency converter 36 provides a series of pulses of constant duration having a frequency proportional to the applied input voltage from high impedance voltage follower 35, which input voltage varies directly with the cargo compartment temperature as derived from the voltage developed between the thermistor 18 and resistor 18a voltage divider. These output pulses of converter 36 feed through a gate 37 and line 36a as input to micro-processor 40 during predetermined time intervals clocked by the latter through line 37a. By circuit board wiring comprising an address bus 41 and a data bus 41a, micro-processor 40 and ROM 45 are permanently programmed with the aid of a micro-processor development system, well understood in the art, to perform in continuing, repetitive, updating cycles of predetermined duration.

The program may be generally described as (1) developing, under the control of oscillator 39, a timing frequency of 1 second during which time each repetitive updating cycle is performed, the cycle being represented in FIG. 4 as signal 50, a shift clock signal 51, a temperature write signal 53, a mode write signal 54, and an erase signal 55; (2) converting the frequency of the pulses presented at gate 37 and line 36a into a fourteen bit binary code and the on/off conditions of mode lights LC, LD and LH presented by inputs 26, 27 and 28, respectively, into a seven bit code, both codes being determined in accordance with the position of manual switch 16; (3) combining the two codes as serial data output represented by signal 52; and (4) synchronizing the clock signal 51, write signals 53 and 54, erase signal 55, and the serial data signal 52 in a predetermined timed relation for repetitive performance within each 1 second updating cycle 50. The cycling of micro-processor 40 is initiated by a power on reset pulse generator 38 in the conventional manner.

As indicated in FIG. 3, each of the seven segments of digitals 31, 32 and 33 is wired through buses 31a, 32a and 33 a and interposed drivers 48, 48a and 48b to respond to the data present at each of the corresponding seven terminals of shift registers 47, 47a and 47b, respectively, the latter registers being wired for serial loading by serial data signal 52 under synchronized control of shift clock signal 51. Signals 51 and 52 are carried in lines 43 and 44, respectively, from micro-processor 40 to shift registers 47, 47a and 47b. Drivers 48 and 48a, which power the "on" coils (not shown) of digitals 31 and 32 of the temperature readout, operate in unison under the control of temperature write signal 53 carried in line 46b, while driver 48b for the "on" coils (not shown) of digital 33 of the operational mode readout is separately controlled by mode write signal 54 carried in line 46c. The erase signal 55 is carried in line 46a to driver 49, which simultaneously powers all the "erase" coils (not shown) in digitals 31, 32 and 33 through common line 34 and branching buses 31b, 32b and 33b. Latch 46, receiving programmed input from microprocessor 40 through data bus 41a and a clock pulse line 42, generates signals 53, 54 and 55 in the time relation indicated in FIG. 4.

Various components represented in the block diagram of FIG. 3 are further identified as the following but are not limited thereto.

Isolator assembly 30—optical couplers
Gate 37—flip-flop, RCA 4013
Micro-processor 40—RCA CDP1802CE
ROM 45—Signetics N82S131N (two units)
Shift registers 47, 47a, 47b—RCA 4015
Latch 46—RCA 4042
Drivers 48, 48a, 48b—transistor arrays RCA CA3081, diodes IN4148
Driver 49—Transistor MPS-U45, diode IN4003

The practical utility and operation of the temperature and operating mode monitoring and remote display unit 10 will now be apparent. After mounting casing 11 on the left corner of the front wall of trailer T, sensor 18 is inserted into the cargo compartment through a suitably drilled opening, wires 26,26a, 27,27a, and 28,28a are connected to mode lights LC, LD and LH, respectively, and wires 24,24a are connected to the proper terminals of battery B, thereby completing the simple installation of unit 10. The temperature in cargo compartment will now be displayed in window 14 as a real or reverse image in accordance with the position of switch 16. If refrigeration unit F is operating, the mode will also be displayed in window 15. When unit F is not operating, the mode indicator in window 15 will be blank. The letters indicating the operational modes of refrigeration unit F are chosen as C for cooling, F for defrost and H for heating and a legend to that effect (not shown) may be printed on front panel 12 to the left of window 15. In FIG. 2, as an illustrative example, switch 16 being in the reverse position, window 14 displays a temperature of 43° F. in reverse image and window 15 shows an H which is the same in both displays. As will be clear from FIG. 5, this reverse image will be viewed in proper perspective in mirror M by the driver in cab C.

A summary of the operation of unit 10 will be described with reference to FIGS. 3 and 4. When electric power is first turned on either by direct connection to battery B, as shown in FIG. 1, or by means of a suitable switch (not shown) but interposed in either wire 24 or 24a, a pulse supplied by generator 38 resets micro-processor 40 to the beginning of updating cycle 50. The programmed sequence of operations of micro-processor 40, some of which are illustrated in FIG. 4, contemplates digestion of the input information, namely, operating mode of refrigeration unit F by inputs 26, 27 and 28, frequency input through gate 37 and the position of switch 16, and preparation of the codes for subsequent serial output during the latter part of each cycle 50. Therefore, loading of the shift registers 47, 47a and 47b, seen in FIG. 4 to occur at the beginning of each cycle 50, incorporates the input conditions detected in the previous cycle 50. Shift clock signal 51 comprises twenty-one pulses (fewer being shown for clarity) which are synchronized with signal 52 for loading the serial data contained in the latter in each of the twenty-one output terminals of shift registers 47, 47a and 47b in the well understood manner. After loading is completed, temperature write signal 53 triggers drivers 48 and 48a and mode write signal 54 simultaneously triggers driver 48b. This triggering enables drivers 48 and 48a to simultaneously energize the "on" coils of those segments of corresponding digitals 31 and 32 for which a binary "on" condition is present in the corresponding terminal in shift registers 47 and 47a. Triggering by write signal 54 similarly effects driver 48b and digital 33 with respect to shift register 48b. Also, simultaneously with write signals 53 and 54, erase signal 55 is generated and through driver 49 simultaneously energizes all the "erase" coils of all the segments in digitals 31, 32 and 33. As will be clear from FIG. 4, signals 53 and 54 are of the same duration, which may be approximately 100 milli-seconds, while signal 55 is half the duration, approximately 50 milli-seconds. The opposing effects of the simultaneous flow of current in the "on" coil and in the "erase" coil of a particular segment neutralize each other resulting in that segment remaining stationary in whatever position existed prior to pulsing. Also, the energizing of an "on" coil in a segment already "on" creates no movement or visible effect and likewise the energizing of an "erase" coil in a segment already "off" creates no movement or visible effect. Thus, during the first 50 milli-seconds, the "erase" coil is always energized. When there is no "on" signal, if the segment is "off" it will remain "off", if it is "on" it will be turned "off". When there is an "on" signal, nothing occurs during the first 50 milli-seconds, but during the second 50 milli-seconds, if the segment is "off" it is turned "on", if the segment is "on" it remains "on". It will thus be apparent that as long as the temperature and operational mode as detected at the input of micro-processor 40 remain the same the corresponding digital readout will not change from cycle to cycle and no chattering or flashing of the display will result. During the remainder of cycle 50, micro-processor 40 completes its program including counting the pulses in the output of voltage to frequency converter 36, converting the count to the binary code in accordance with the setting of switch 16 as well as determining the on/off condition of signal lights LC, LD and LH and converting that information to binary code for combining with the temperature code preparatory to their output as serial data in signal 52 at the beginning of the next cycle.

Unit 10 has the capability of detecting and displaying temperatures ranging from −19° F. to +80° F. No sign need be used for + degrees F. Since the most significant digit in the minus reading is not more than 1, the minus sign is indicated by displaying the middle horizontal segment, conventionally known as the "G" segment, thereby eliminating the need for an extra digital to indicate + or − degrees F.

Unit 10 is also designed and programmed to produce a warning signal in the form of a flashing of the temperature display when the temperature in the cargo compartment exceeds, in either direction, the −19 or +80 degree range of the instrument. Flashing is also utilized to indicate an "on" condition for more than one of the mode lights LC, LD or LH. Thus both letters of the "on" condition will be displayed simultaneously and will also be flashed. Since the use of separate write signals 53 and 54 enables either signal to be omitted while the other is present, flashing is readily accomplished by the program which omits the temperature write signal 53 from alternate cycles 50 when flashing of the temperature display digitals 31 and 32 is desired and, likewise, omits mode write signal 54 from alternate cycles to flash the mode digital 33. It is also apparent that the program may be modified to flash a warning signal whenever predetermined temperature range limitations are exceeded.

Where a more animated display is desired to provide a visual impact for the viewer in contrast to the passive, non-chattering display hereinbefore described, the program may be modified to stagger erase signal 55 with respect to write signals 53 and 54. Thus, erase signal 55 may be timed to commence approximately 0.2 second before the write signals 53 and 54, thereby blanking digitals 31, 32 and 33 for a comparable 0.2 second during each cycle. In this case, write signals 53 and 54 may be shortened to 50 milli-seconds to conserve power. Since the display on digitals 31, 32 and 33 persist after power is turned off, this animated display capability also provides on/off recognition for unit 10.

Where one of the terminals of battery B, usually the negative, is grounded to the chassis of trailer T, harness 20 may be reduced to seven wires by connecting ground wire 29 to the grounded battery lead wire 24a at the merger of branches 21 and 22. The circuitry in casing 11 includes an electric light bulb (not shown) powered by battery B and lit at all times when unit 10 is in operation and located to illuminate digitals 31, 32 and 33 at night or when the lighting is poor.

The temperature and operating mode monitoring and remote display unit herein disclosed is seen to achieve the several objects of the invention and to be well adapted to meet conditions of practical use. As various possible embodiments might be made of this invention, and as various changes might be made in the disclosed unit, it is to be understood that all matters herein set forth or shown in the accompanying drawings are to be interpreted as illustrative and not in a limiting sense.

What is claimed is:

1. A temperature monitoring and remote display unit for trailer trucks having a cab equipped with a rear view mirror, the trailer having a refrigerated compartment and refrigeration equipment therefor, said unit comprising a weather-proof casing having a transparent window, a plurality of seven-segment digitals for displaying temperature values mounted within said casing in a visible position behind said window, bracket means for attaching the casing to a front exterior wall of said trailer positioned for viewing said digitals in the rear view mirror by the driver in the cab and from the ground when the trailer is parked, electronic means including a sensor mounted within said refrigerated compartment for monitoring the temperature within said compartment and displaying the results on said digitals in either a real image for said ground viewing or a reverse image for said mirror viewing, and a manual switch included in the electronic means for selecting the real or reverse image display.

2. The unit defined in claim 1 in which said electronic means includes a micro-processor and ROM programmed to convert a pulse frequency proportionally related to the compartment temperature to either of two binary codes as output to said digitals in accordance with the position of said switch in continuous repetitive updating cycles of predetermined duration.

3. The unit defined in claim 2 in which said digitals are of the electro-magnetic type having independently operable "on" and "erase" coils for each segment, said electronic means including a driver for each of said "on" coils in each of said digitals and a common driver for all the "erase" coils, shift register means having a terminal connected to control each of said "on" drivers, said program generating a serial output signal of said selected binary code, a shift clock signal, a write signal for said "on" coil drivers and a signal for said "erase" drivers, and said serial data and shift clock signals being synchronized to load said shift register means.

4. The unit defined in claim 3 in which said write signal and said "erase" signal are synchronized for simultaneous initiation, said write signal being of longer duration than said "erase" signal whereby the presence of an "on" pulse to each of the segments neutralizes the "erase" pulse for retaining without change a segment turned on by a previous cycle to eliminate flashing between cycles, said "on" pulses persisting for a sufficient time interval beyond the "erase" pulse to turn to an "off" segment.

5. The unit defined in claim 3 in which said "erase" signal precedes said write signal by a predetermined short time interval sufficient to blank said digitals for a small fraction of each cycle providing visual impact and on/off recognition for the viewer.

6. The unit defined in claim 3 in which said program omits said write signal for the "on" coil drivers in alternate cycles when predetermined temperature values are exceeded to provide flashing of the digitals as a warning.

7. The unit defined in claim 1 in which the digitals are two in number and the temperature range displayed is between $-19°$ F. and $+80°$ F., the minus sign being displayed as the "G" segment of the most significant digit.

8. A temperature and operating mode monitoring and remote display unit for trailer trucks having a cab equipped with a rear view mirror, the trailer having a refrigerated compartment and refrigeration equipment therefor, said equipment having indicator lights for each of the three operating modes thereof, said unit comprising a weather-proof casing having larger and smaller transparent windows, a pair of seven-segment digitals located side-by side for displaying temperature values mounted within said casing in a visible position behind said larger window, a single seven-segment digital for displaying the operational mode mounted within said casing in a visible position behind said smaller window, bracket means for attaching the casing to a front exterior wall of said trailer positioned for viewing said digitals in said rear view mirror by the driver in the cab and from the ground when the trailer is parked, electronic means including a sensor mounted within said refrigerated compartment for monitoring the temperature within said compartment and the on/off condition of each of said operating lights and displaying the temperature on said pair of digitals and the mode condition on said single digital in either a real image for said ground viewing or a reverse image for said mirror viewing, and a manual switch included in said electronic means for selecting the real or reverse image display.

9. The unit defined in claim 3 in which said digitals are of the electro-magnetic type having colored display for maximum visibility both in sunlight and when illuminated at night.

* * * * *